(12) United States Patent
Gamberi et al.

(10) Patent No.: US 12,467,404 B2
(45) Date of Patent: Nov. 11, 2025

(54) PLANT FOR HIGH-EFFICIENCY FUEL TO MECHANICAL ENERGY CONVERSION

(71) Applicant: NUOVO PIGNONE TECNOLOGIE—SRL, Florence (IT)

(72) Inventors: Francesco Gamberi, Florence (IT); Simone Amidei, Florence (IT); Lorenzo Cosi, Florence (IT); Antonio Seminara, Florence (IT)

(73) Assignee: Nuovo Pignone Tecnologie—SRL, Florence (IT)

( * ) Notice: Subject to any disclaimer, the term of this patent is extended or adjusted under 35 U.S.C. 154(b) by 63 days.

(21) Appl. No.: 18/557,531

(22) PCT Filed: Apr. 22, 2022

(86) PCT No.: PCT/EP2022/025171
§ 371 (c)(1),
(2) Date: Oct. 26, 2023

(87) PCT Pub. No.: WO2022/228722
PCT Pub. Date: Nov. 3, 2022

(65) Prior Publication Data
US 2024/0218827 A1     Jul. 4, 2024

(30) Foreign Application Priority Data

Apr. 26, 2021 (IT) .................. 102021000010490
Jan. 4, 2022 (IT) .................. 102022000000071

(51) Int. Cl.
*F02C 3/34*     (2006.01)
*F02C 3/20*     (2006.01)
*F02C 6/02*     (2006.01)

(52) U.S. Cl.
CPC .............. *F02C 3/34* (2013.01); *F02C 3/20* (2013.01); *F02C 6/02* (2013.01); *F05D 2220/76* (2013.01); *F05D 2240/35* (2013.01)

(58) Field of Classification Search
CPC ..................................... F02C 3/34; F02C 6/02
See application file for complete search history.

(56) References Cited

U.S. PATENT DOCUMENTS

| | | | | |
|---|---|---|---|---|
| 4,498,289 A | * | 2/1985 | Osgerby | F02C 6/003 60/647 |
| 6,089,011 A | * | 7/2000 | Shouman | F02C 3/305 60/39.15 |
| 2002/0134085 A1 | | 9/2002 | Frutschi | |
| 2011/0179799 A1 | | 7/2011 | Allam | |
| 2013/0213049 A1 | | 8/2013 | Allam | |
| 2016/0363003 A1 | * | 12/2016 | Davidson | F01D 25/10 |
| 2018/0340454 A1 | | 11/2018 | Smogorzewski | |
| 2019/0063319 A1 | | 2/2019 | Forrest | |

FOREIGN PATENT DOCUMENTS

EP     2971647 A1     1/2016

* cited by examiner

*Primary Examiner* — Scott J Walthour
(74) *Attorney, Agent, or Firm* — Paul Frank + Collins P.C.

(57) ABSTRACT

An energy conversion plant is disclosed, having a plurality of driving units, for driving respective loads, such as an electric motor or a centrifugal compressor. The energy conversion plant comprises at least one heat exchange recuperator, for heating pre-compressed carbon dioxide to be fed into the driving units by the heat produced by the driving units themselves.

16 Claims, 10 Drawing Sheets

PLANT FOR HIGH-EFFICIENCY FUEL TO MECHANICAL ENERGY CONVERSION

TECHNICAL FIELD

The present disclosure concerns a fuel to mechanical energy conversion plant that can be used for power generation, which is based on a thermodynamic cycle, for mechanically driven application and/or multiple power generation trains. The thermodynamic cycle operates through the use of a fluid, such as carbon dioxide, to transfer the energy generated by the combustion of a fuel.

BACKGROUND ART

In the field of power generation, fossil fuels are still mainly used. However, as is well known, they have the severe drawback of producing an increase of carbon dioxide ($CO_2$), as well as other emissions. This is one of the causes of the so-called global warming, which is supposed to be potentially dangerous and the cause of natural disasters in the future.

At the moment alternative energy production systems do not have the capability to replace fossil fuel combustion, at least in the short term. In particular, the power production with such alternative methods cannot satisfy the consumption needs of the evolute population.

Based on the above, the research in the field is striving to improve known power production systems based on fossil fuels or biomasses to reduce the production of carbon dioxide to be introduced into the atmosphere, maintaining at the same time a high level of energy efficiency.

In addition, known power production systems based on fossil fuels or biomasses turn out to be expensive if compared with other systems. In fact, the capital expenditures and the maintenance costs increase the overall cost per Mega Watt produced. Therefore, the design trend is that of decarbonizing mechanical drive production operation at lower capital expenditures.

Accordingly, an improved fuel to mechanical energy conversion plant, capable of increasing the efficiency, and therefore, reducing the carbon dioxide per kilowatt produced, while using the oral carbon dioxide introduced into the atmosphere, would be welcomed in the technology.

SUMMARY

In one aspect, the subject matter disclosed herein is directed to a fuel to mechanical energy conversion plant. The energy conversion plant has a fluid feedback line to supply a fluid, specifically carbon dioxide, and a compression and pumping unit, to compress and increase the pressure of the fluid feedback line. The energy conversion plant has also a plurality of driving units, each one connected to drive a relevant load, such as a compressor or an electric generator, through burning fuel and expanding the fluid. The energy conversion plant comprises one or more heat exchange recuperator, connected between the fluid feedback line and the driving units, and between each driving unit and the compression and pumping unit. Each heat exchange recuperator is arranged for heating the fluid supplied by the fluid feedback line and compressed by the compression and pumping unit, to be fed into the driving units, by exchanging the heat of the expanded discharged fluid from the driving units.

In another aspect, the subject matter disclosed herein regards that each driving unit comprises a combustor to burn fuel, an expander, operatively connected to the combustor, a rotating shaft, driven by the expander, connected to the load, namely to the compressor or the electric generator, for instance.

In another aspect, the subject matter disclosed herein is directed to the fact that the compression and pumping unit comprises a separation unit for separating the water from the fluid coming from the driving units, after being cooled by at least one heat exchanger recuperator; a compressor, for compressing and increasing the pressure of the dehumidified fluid, a heat exchanger, and a pump, for increasing the pressure of the fluid. The pump is interposed between the heat exchanger and the fluid feedback line.

In further aspect, the subject matter disclosed herein is directed to an energy conversion plant having one or more fluid extraction lines, to extract the fluid in pressure. The extraction lines may be connected to the fluid feedback line or upstream the pump.

In another aspect, the subject matter disclosed herein is directed to an fuel to mechanical energy conversion plant having a plurality of driving unit, each one connected to a relevant load, where the load can be an electric generator and/or a centrifugal compressor and/or an electric generator connected to a centrifugal compressor.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

In the various figures, similar parts will be indicated by the same reference numbers.

DETAILED DESCRIPTION OF EMBODIMENTS

In the field to power generation where fossil fuels are used, it requested a reduction of carbon dioxide production, which, as it is well known, dangerous. There are some power production layouts capable of recovering the heat using a transport fluid, to save energy. The fluid used can be carbon dioxide. According to one aspect, the present subject matter is directed to a layout of an energy conversion plant comprising a plurality of driving units for driving relevant loads, all operating based on a recovering the heat generated by the combustion of fossil fuels, conveyed by carbon dioxide.

Figure 1:
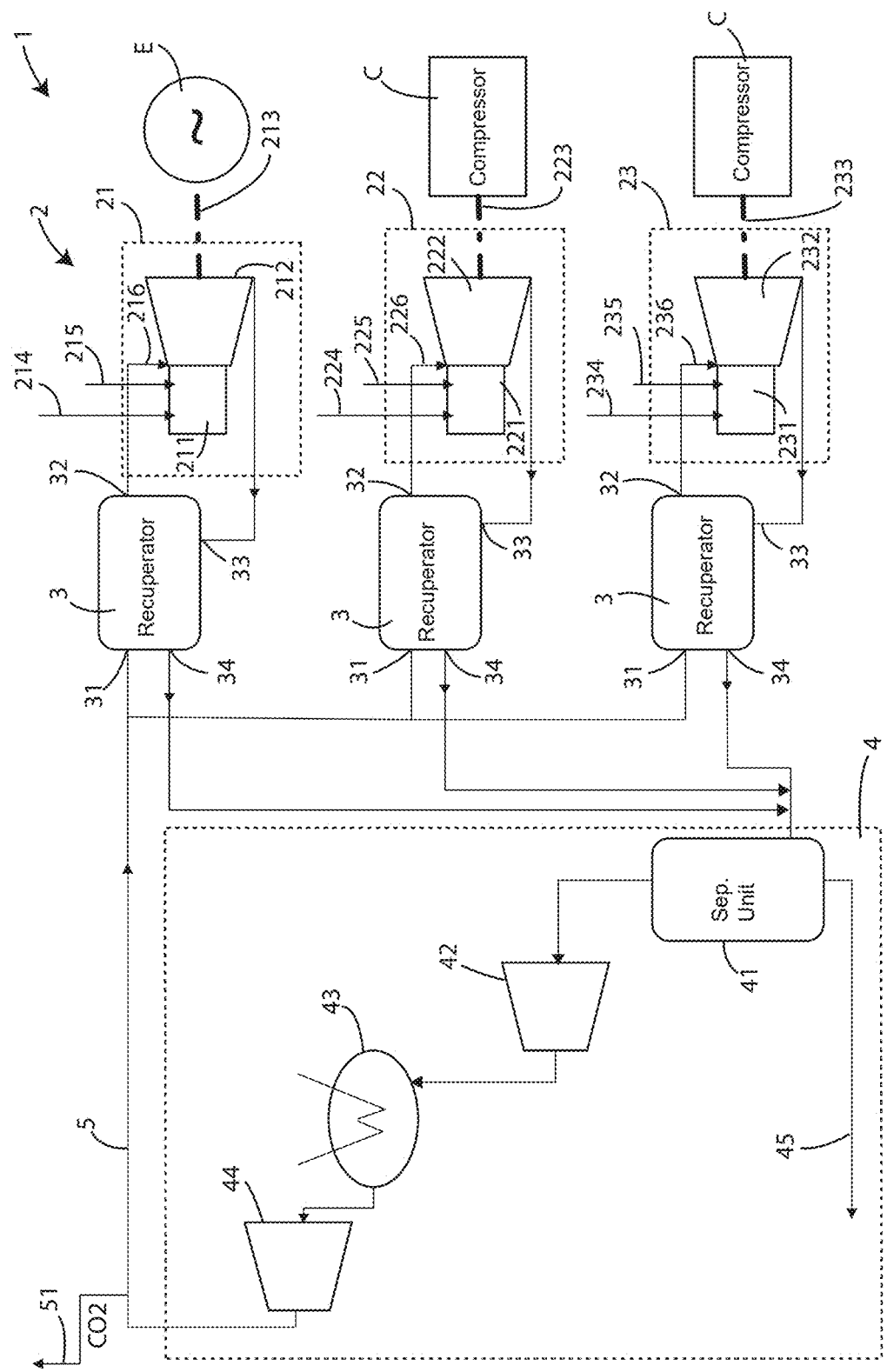
FIG. 1 illustrates a schematic of a fuel to mechanical energy conversion plant according to a first embodiment.

Referring now to the drawings, FIG. 1 shows a fuel to mechanical energy conversion plant, or simply energy conversion plant, according to a first embodiment, wholly indicated with reference number 1.

In particular, the energy conversion plant 1 basically comprises a plurality of driving units 2, which is connected to a respective load, as it will be better specified below, a plurality of heat exchanger recuperators 3, each one connected to the relevant driving unit 2, compression and pumping unit 4, connected to the heat exchanger recuperators 3, and a fluid or carbon dioxide feedback line 5, connected between the output of the compression and pumping unit 4 and to the heat exchanger recuperator 3.

With continuing reference to FIG. 1, the energy conversion plant 1 comprises specifically three driving units, namely a first driving unit 21, a second driving unit 22, and a third driving unit 23.

The first driving unit 21 comprises in particular a combustor 211, and an expander 212, connected to the combustor 211. The combustor 211 has a fuel inlet 214, for the introduction of the fuel to be burned, an oxidant inlet 215, for the introduction of the additional fluid, namely carbon dioxide and pure oxygen, for the case at issue, and a fluid inlet 216, to supply the fluid to be recuperated as better explained below.

More specifically, with reference to oxidant inlet 215, this fluid can be comprised of pure oxygen or a mixture of pure oxygen and carbon dioxide, taken from the described loop in this solution. Pure oxygen is produced with industry ready production methods, like ASU—Air Separation Units or any other available system.

A rotating shaft 213 is also driven by the expander 212. Each driving unit 2 is capable of transforming the fuel and the carbon dioxide as input of the combustor 211 into mechanical energy.

Still referring to the first driving unit 21, it is connected to an electric machine E, connected to the expander 212 through the rotating shaft 213. In this case, then, the electric machine E is the load of the first driving unit 21. Therefore, by this configuration, the first driving unit 21 is capable of transforming chemical energy, obtained by burning the fuel and expanding the carbon dioxide (the fluid used), in electric energy, possibly to be introduced into the mains (not shown in the figure).

Referring now to the second driving unit 22, it also comprises a combustor 221 and an expander 222, but in this case, it is connected through the relevant rotating shaft 223 to a centrifugal compressor C, which in this case is a mechanical load. Of course, different mechanical loads can be provided, depending on the necessities. The expander 222 also has a fuel inlet 224, an oxidant inlet 225, and a fluid inlet 226.

Also, the third driving unit 23, which, likewise the first 21 and the second 22 driving unit, comprises a combustor 23 and an expander 232. The expander 232 has a has a fuel inlet 234, an oxidant inlet 235, and a fluid inlet 236. The fluid expander 232 is connected through the rotating shaft 233 to another centrifugal compressor C, also in this case as a mechanical load.

By the layout shown in FIG. 1, the energy conversion plant 1 drives an electric generator E, so as to produce electric energy, and two mechanical loads, namely, the centrifugal compressors C.

In some embodiments, gearboxes can be included between the driving units 21, 22, and 23 and the relevant loads, connected to the relevant rotating shafts 213, 223, and 233. The conversion ratio of the gearboxes differ according to the design needs.

In other embodiments, a different number of driving units 2 can be foreseen, depending on the number and the type of loads to be driven.

For each driving unit 2, namely the first 21, the second 22, and the third 23 driving unit, there is a relevant heat exchanger recuperator 3. Each heat exchanger recuperator 3 has a first inlet 31, connected to a carbon dioxide feedback line 5, through which high pressure, low-temperature carbon dioxide enters into each one of the heat exchanger recuperators 3, and a first outlet 32, connected to the combustor 211 of the relevant driving unit 2, and specifically to the fluid inlet 216, through which high pressure and high-temperature carbon dioxide are introduced into the combustor of the relevant driving unit 2, e.g., with reference to the first driving unit 21, the combustor 211.

Also, each heat exchanger recuperator 3 has a second inlet 33, connected to the expander of the relevant driving unit 2, e.g., with reference to the first driving unit 21, the expander 212, through the turbine discharge stream, where the low pressure-high temperature of the carbon dioxide here used as the fluid, enters into the heat exchanger recuperator 3, and a second outlet 34, connected to the compression and pumping system 4, as better explained below, where the low pressure, low-temperature fluid (the carbon dioxide) is extracted from the heat exchanger recuperator 3.

The heat exchanger recuperator 3 is configured to heat the high pressure (detail on the pressure and temperature operating ranges of the fluid, namely the carbon dioxide, are given in the following) before being introduced into driving unit 2 and being expanded by the combustion of the fuel, so as to drive the load connected thereto, namely the electric generator E, or the centrifugal compressor C. The heat exchanger recuperator 3 through the heated carbon oxide of the discharge stream of the related driving unit 2 heats the carbon oxide coming from the carbon dioxide feedback line 5. In other words, the heat exchanger recuperator 3 cools the fluid (the carbon dioxide), transferring its heat to the high-pressure fluid coming from the carbon dioxide feedback line 5, before introducing it into a driving unit 2.

The heat exchanger recuperator 3 can comprise one or more heat exchangers, to allow an improved extraction of the heat from the carbon dioxide feedback line 5.

Still referring to FIG. 1, it is possible to see that the compression and pumping unit 4 is connected between the second outlet 34 of each driving unit 3, and the carbon dioxide feedback line 5. The compression and pumping unit 4 has the function of separating the water and in general the humid part from the fluid, and increase the pressure of fluid, before being reheated by the heat exchanger recuperator 3.

The compression and pumping unit 4 shown in the first embodiment of the energy conversion plant 1 of FIG. 1 comprises a separation unit 41, a compressor 42, a heat exchanger 43, and a pump 44, series-connected.

In other embodiments a plurality of sets of compressors and pumps can be present as well, possibly operating in parallel.

The separation unit 41 separates the liquid water from the discharge stream coming from each driving unit 21, 22, and 23, after being cooled by the heat exchanger recuperators 3.

After that the fluid is dehumidified by the separation unit 41, the compressor 42 compresses it, thus, increasing the pressure of the same.

Then the fluid passes through the heat exchanger 43, so that the temperature of the fluid is brought to the ambient temperature.

Eventually, the fluid passes through pump 44, which increases the pressure of the fluid, before introducing the same into the carbon dioxide feedback line 5, which, as mentioned above, is connected to the first inlet 31 of the heat exchanger recuperator 3.

Also, the carbon dioxide feedback line 5 includes a carbon dioxide extraction line 51, whereby it is possible to extract pressurized carbon dioxide from the plant 1. The advantage and the operation of the extraction line 51 will be better explained below.

The operation of the energy conversion plant 1 operates as follows.

The fuel and the fluid, namely, in the case at issue, the carbon dioxide, enter into the combustor of each driving unit 2 through the fuel inlet, the oxidant inlet, and the fluid inlet. In particular, the fuel and the carbon dioxide entering into the combustor 211 of the first driving unit 21, the combustor 221 of the second driving unit 22, and the combustor 231 of the third driving unit 23. Then, the expander of each driving unit 2 drives the relevant load. More specifically, the expander 212 of the first driving unit 21 drives the electric generator E, while the expander 222 of the second driving unit 22, as well as the expander 232 of the third driving unit 23 drives the relevant centrifugal compressor C (or a plurality of compressors).

From each expander 212, 222, and 232, the carbon dioxide, which now is expanded but has a high temperature, in view of the combustion reaction, is introduced into the second inlet 33 of the heat exchanger recuperator 3. In particular, in the energy conversion plant 1 according to the first embodiment, the temperature is comprised between 500-700° C., and the pressure is comprised between 20-40 bar. Different temperature ranges can be foreseen, depending on the type of driving unit 2 installed and the load each unit is operating at.

Then, the fluid, after passing through the heat exchanger recuperators 3, is cooled so that the temperature is brought to around ambient temperature, while the pressure is almost the same. The fluid, namely the carbon dioxide, comes out from the heat exchanger recuperators 3, to reach the compression and pumping unit 4. In particular, the water is extracted from the fluid through the separation unit 41 and discharged by a drain pipe 45.

The fluid, before being compressed by the compressor 42, is at ambient temperature and at an almost unchanged pressure, namely, it remains at about 20-40 bar, while the temperature depends on the cooling temperature of the cooling media. Instead, after the compressor 42, the temperature of the fluid depends on the compressor(s) 42 architecture (the compressor 42 may be intercooled or not), while the pressure is increased to 60-100 bar.

Then fluid passes through the heat exchanger 43, after which it is at the same pressure of 60-100 bar and it is back at cooling fluid/room temperature.

Finally, the pressure of the fluid is increased up to 250-350 bar, through the pump 44, with the temperature depending on the pump(s) 44 architecture. In fact, the pumps 44 in some embodiments may be equipped with an intercooler (or not), depending on the pump design. The fluid at ambient temperature and at the pressure of 250-350 bar is then introduced into the carbon dioxide feedback line 5.

As mentioned before, the feedback line 5, before entering the heat exchangers 3, has an extraction line 51, which is capable of extracting part of the carbon dioxide ($CO_2$) directly in pressurized and pure condition. The quantity of the carbon dioxide extracted is such that the feedback line 5 header pressure is maintained relatively constant (between 250-350 bar), while the quantity is subject to the load of the plant is running at. In other words, the carbon dioxide extracted from the extraction line 51 is directly linked to the fuel consumed by the plant 1.

In other embodiments, the extraction line 51 can also be placed before (upstream) the pump 44 suction, in case the carbon dioxide product is needed at lower pressures by possible other end user/applications. Therefore, the fuel to mechanical energy conversion plant 1 has the additional advantage to have the function to produce pure carbon dioxide at possible different pressures. Additionally, more than one extraction lines can be provided in the energy conversion plant 1, connected in different areas or points of the carbon dioxide circuit, to extract the carbon dioxide at different pressures, according to the necessities.

The feedback line 5, as mentioned above, connects the pump 44 to the first inlet 31 of the heat exchanger recuperators 3. Passing through the heat exchanger recuperators 3, the carbon dioxide undergoes an increase of temperature, keeping the same pressure. In this way, before entering each of the driving units 21, 22 or 23, the fluid has a pressure of 250-350 bar, and the temperature between 500-700° C.

As it is clear, the energy conversion plant 1 can drive three different loads, even different from each other, through a low emission of carbon dioxide, which is used as fluid to be compressed and increased in temperature, using a thermodynamic cycle where a heat exchanger recuperator 3 recovers part of the heat generated by the driving unit 2 and in particular by the expanders.

In this way, it is obtained carbon dioxide directly captured in pressurized form, while maintaining an high efficiency of the plant 1, which turns out also to the reduction of the capital expenditure for the maintenance of the energy conversion plant 1 itself.

Figure 2:
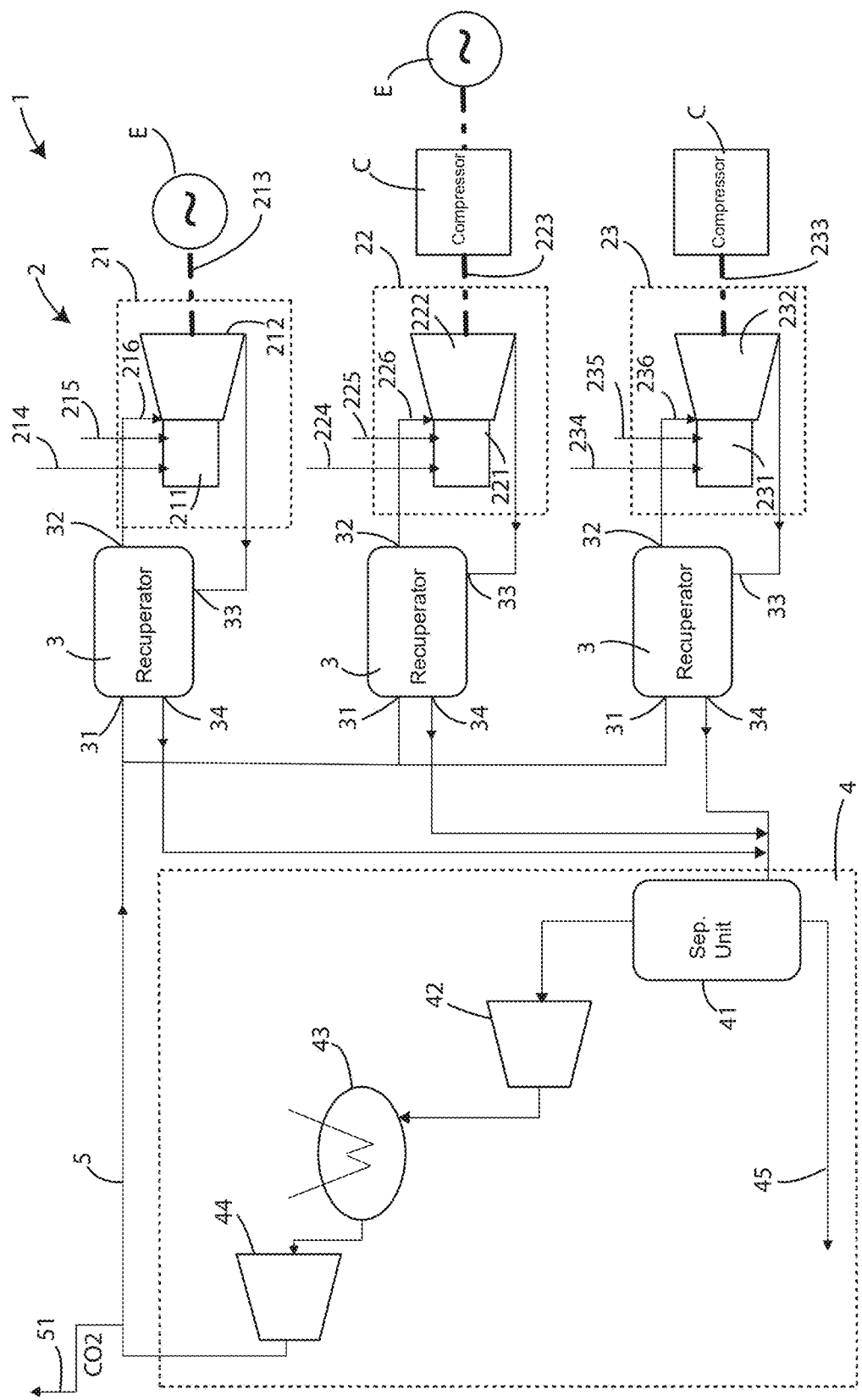
FIG. 2 illustrates a schematic of an energy conversion plant according to a second embodiment.

Referring now to FIG. 2, a second embodiment of the energy conversion plant 1 can be seen. In particular, the layout of the plant 1 is the same as that of the first embodiment, where the expander 212 of the first driving unit 21 is still connected to an electric generator E, as well as the expander 232 of the third driving unit 23 is connected to a centrifugal compressor C. However, the expander 222 of the second driving unit 2 is now connected, always through the rotating shaft 233, to a centrifugal compressor C and, in series, to an electric machine E. With this layout, the electric machine E is capable of operating as a helper motor of the centrifugal compressor C, as well as a generator. The electric machine E is in fact connected to an electric conversion unit (not shown here for simplicity), which allows the electric machine E to operate both as helper motor, as well as generator, in case the expander 212 has some excess of power, which can then be converted into electric energy. In other words, the difference between the energy conversion plant 1 according to the first embodiment (FIG. 1) and the energy conversion plant 1 according to the second embodiment (FIG. 2) is that the load of the second power generation unit 22 is a compressor C series-connected to an electric machine E.

Also, in a variant, the electric machine E may be connected to the rotating shaft 223, and the centrifugal compressor C may be connected downstream the electric machine E. With this layout, the electric generator/machine E is capable of operating as a helper motor of the centrifugal compressor C, as well as a generator. The electric machine E is in fact connected to an electric conversion unit (not shown here for simplicity) which allows the same to operate both as helper motor as well as generator, in case the expander 212 has some excess of power that can be converted into electric energy.

The operation of power generation plant 1 of the second embodiment is the same of that of the first embodiment.

Figure 3:
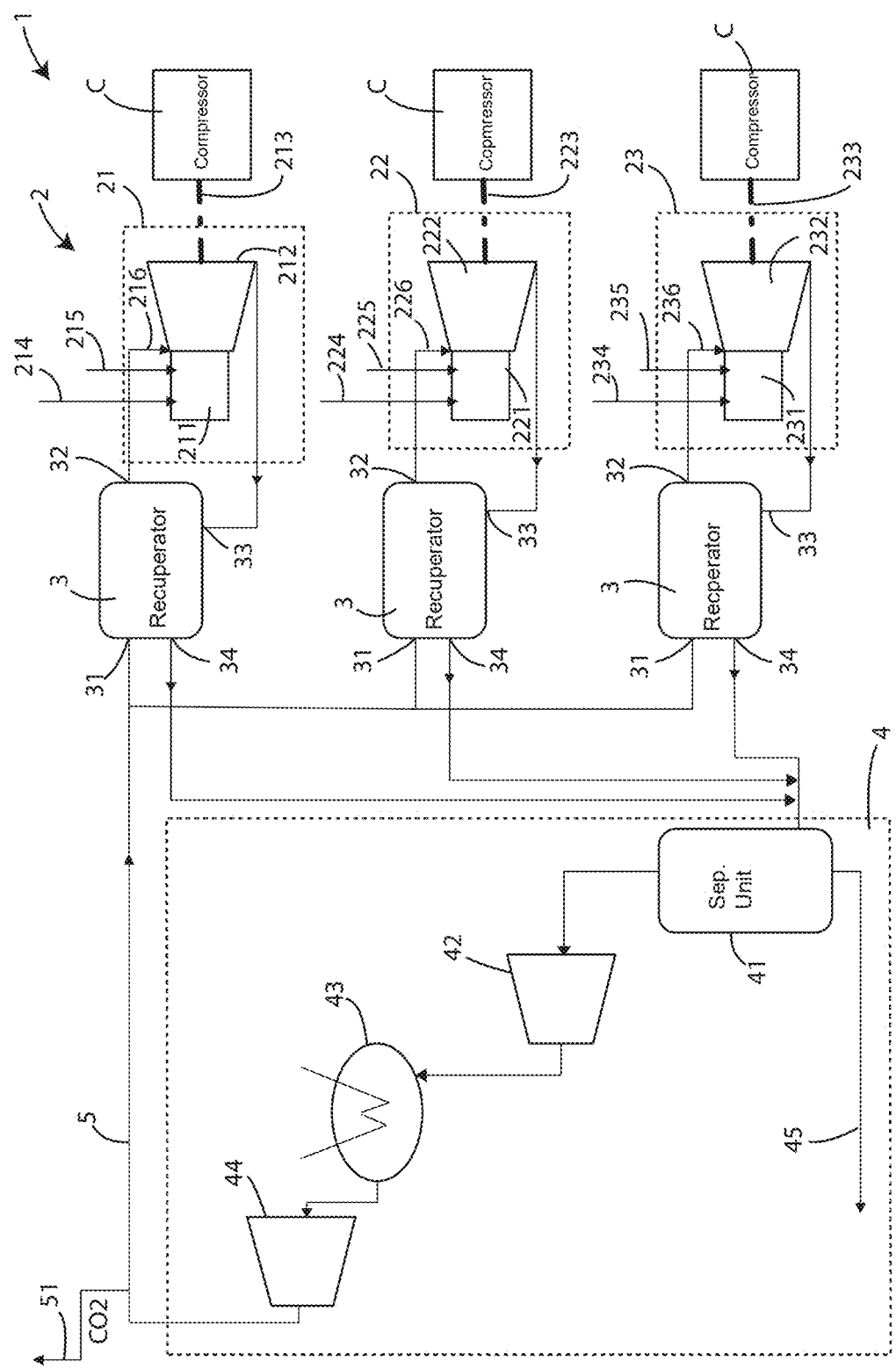
FIG. 3 illustrates a schematic of an energy conversion plant according to a third embodiment.

Referring now to FIG. 3, it is shown a third embodiment of the power generation plants 1 where, if compared to the first embodiment, all the driving units 21, 22, and 23 are connected to a respective centrifugal compressor C. In this case, then, all the loads are mechanical.

The operation of power generation plant 1 of the third embodiment is the same of that of the first embodiment.

Figure 4:
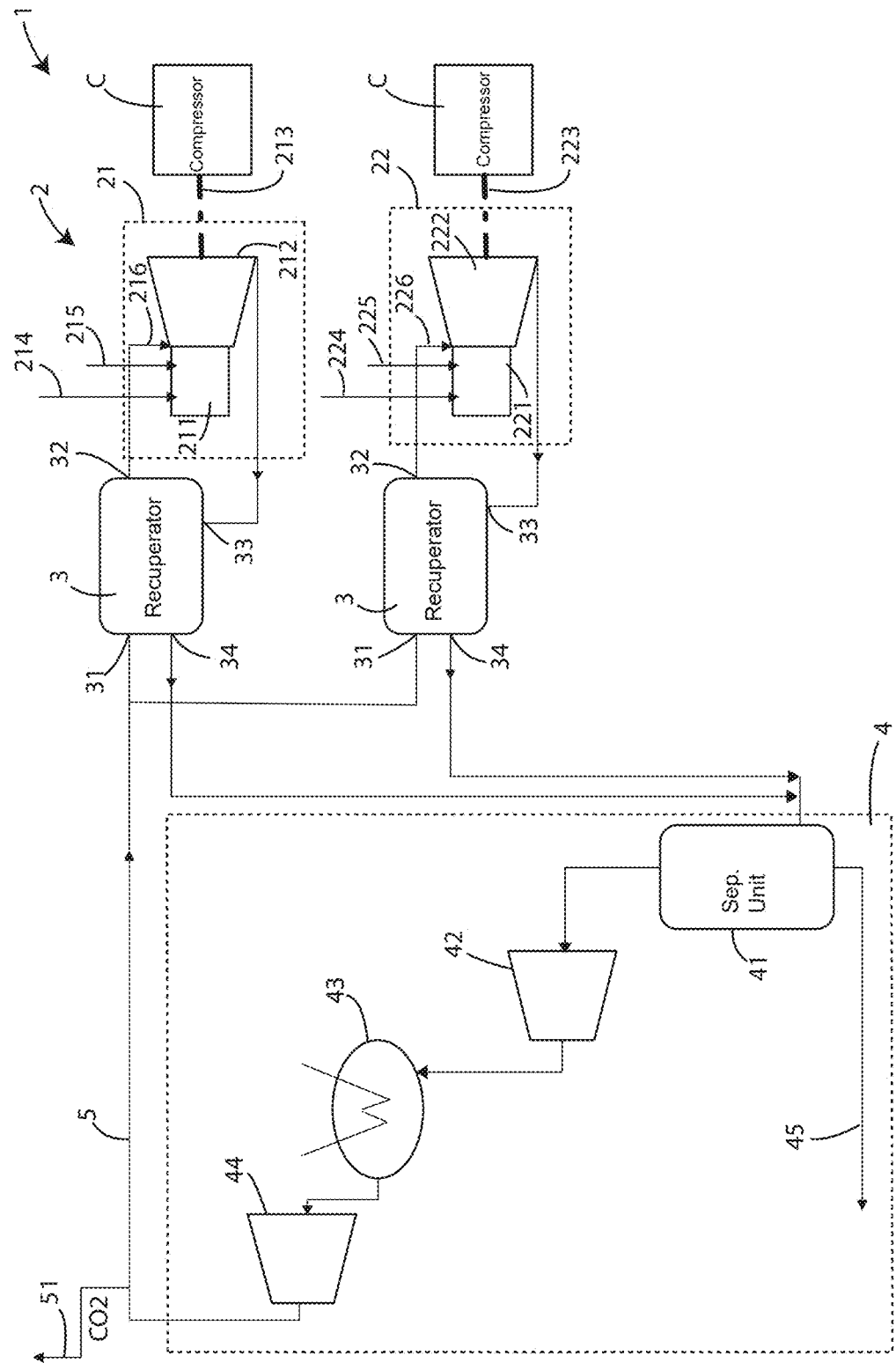
FIG. 4 illustrates a schematic of an energy conversion plant according to a fourth embodiment.

Referring to FIG. 4, a fourth embodiment of the energy conversion plant 1 is illustrated, comprising two driving units 21 and 22, and to respective two heat exchanger recuperators 3.

Each one of the driving units 21 and 22 is connected to centrifugal compressor C, the latter intended to transform the mechanical energy taken from the rotating shafts 213 and 223 of the driving units 21 and 22 into electric energy, to be, for example, introduced into the mains.

The operation of power generation plant 1 of the fourth embodiment is analogous to that of the first embodiment.

Figure 5:
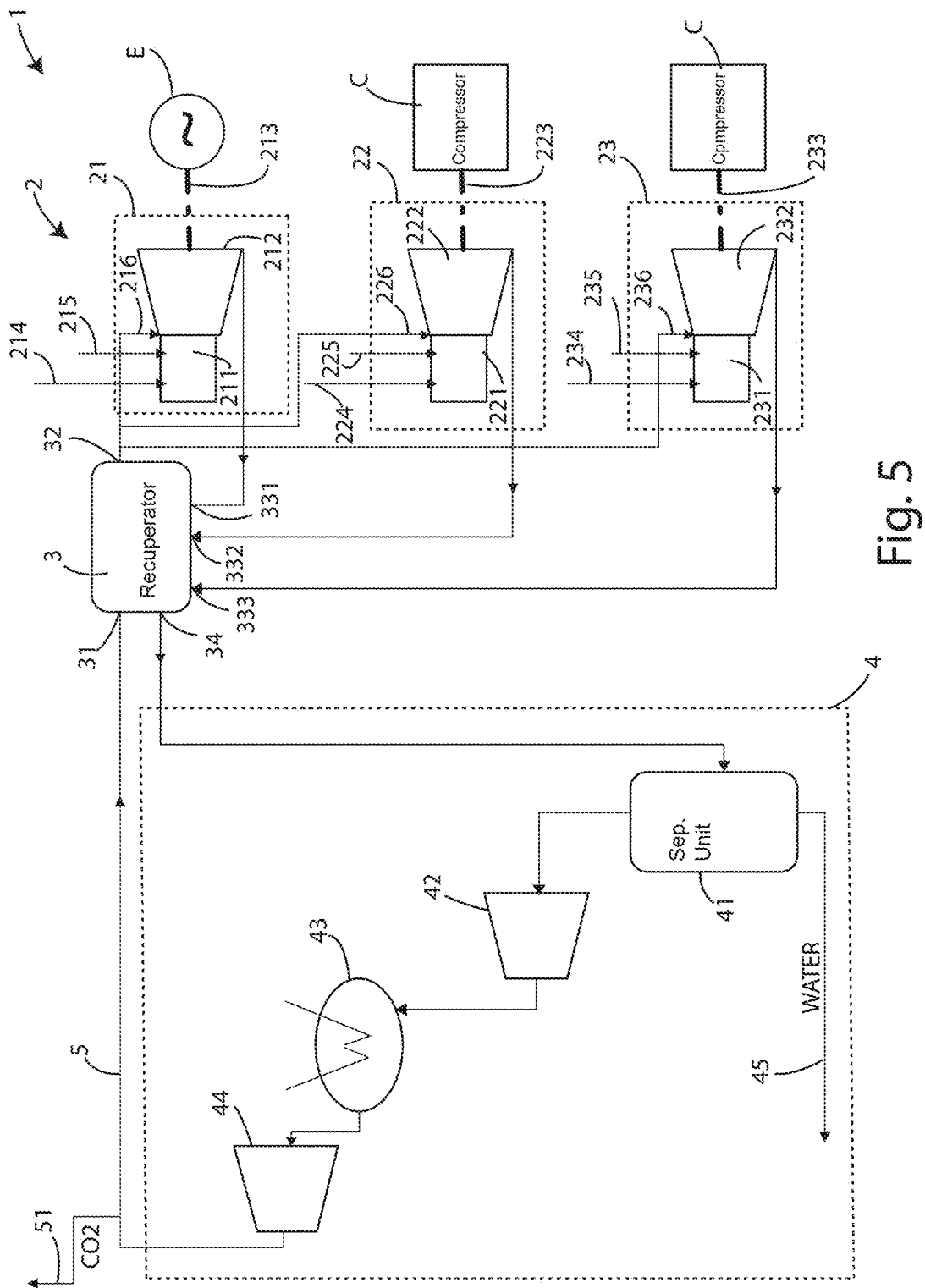
FIG. 5 illustrates a schematic of an energy conversion plant according to a fifth embodiment.

Referring now to FIG. 5, it is illustrated a fifth embodiment of the energy conversion plant 1, which comprises a plurality of driving units 2. Specifically, it comprises a first 21, a second 22, and a third 23 driving units, respectively connected to an electric generator E, a centrifugal compressor C, and a further centrifugal compressor C.

The energy conversion plant 1 according to the fifth embodiment comprises a single heat exchanger recuperator 3, which in this case has a first inlet 31, connected to the carbon dioxide feedback line 5, through which, as already described, high pressure, -low temperature carbon dioxide enters into the heat exchanger recuperator 3, and a first outlet 32, connected to the combustor 211, 221 and 231 of driving unit 21, 22 and 23. The high pressure, high-temperature carbon dioxide is then introduced into the combustors of the driving units 21, 22, and 23.

The driving unit heat exchanger recuperator 3 also has a plurality of second inlets, indicated with the reference numbers 331, 332, and 333. The number of second inlets 331, 332, and 333 is the same as the driving units 2.

Each second inlet 331, 332, or 333 is connected to a relative expander of a driving unit 2.

Specifically, still referring to FIG. 5, the second inlet 331 of the first driving unit 21 is connected to the relevant expander 212, the second inlet 332 of the second driving unit 22 is connected to the relevant expander 222, and the second inlet 333 of the third driving unit 23 is connected to the relevant expander 232.

Finally, the heat exchanger recuperator 3 has a second outlet 34 connected to the compression and pumping system 4, and in particular to the separation unit 41. The low pressure and low-temperature fluid (i.e., carbon dioxide) is extracted from the heat exchanger recuperator 3 through the second outlet 34.

The operation of the fifth embodiment of the energy conversion plant 1 is entirely similar to that of the first embodiment. The main difference lies in the fact that the single heat exchanger recuperator 3 cools, by means of the carbon dioxide coming from the carbon dioxide feedback line 5, the exhausted fluid coming from the driving units 21, 22, and 23, which is now cooled by a single heat exchanger recuperator 3, rather than having a heat exchanger recuperator 3 for each driving unit 21, 22, or 23.

This layout allows reducing the complexity of the system as well as the overall cost of the same.

Figure 6:
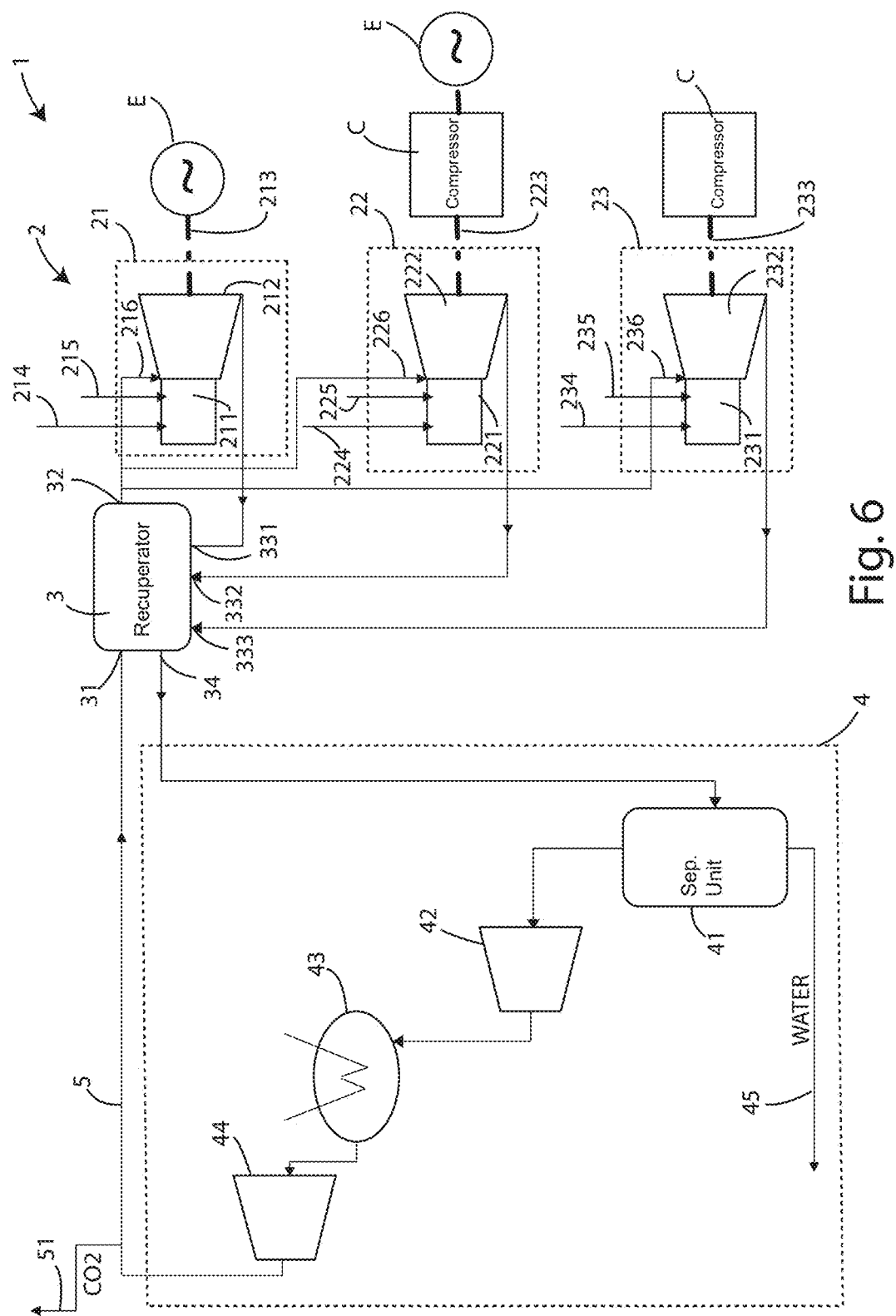
FIG. 6 illustrates a schematic of an energy conversion plant according to a sixth embodiment.

Referring now to FIG. 6, it is shown a sixth embodiment of the energy conversion plant 1. In this case, the layout is the same as the fifth embodiment shown in FIG. 5, however, the second driving unit 22 is connected to a different load through the rotating shaft 223, which is, instead of a centrifugal compressor C, to a combination of the centrifugal compressor C and an electric generator E, wherein the latter can be also used as helper.

Figure 7:
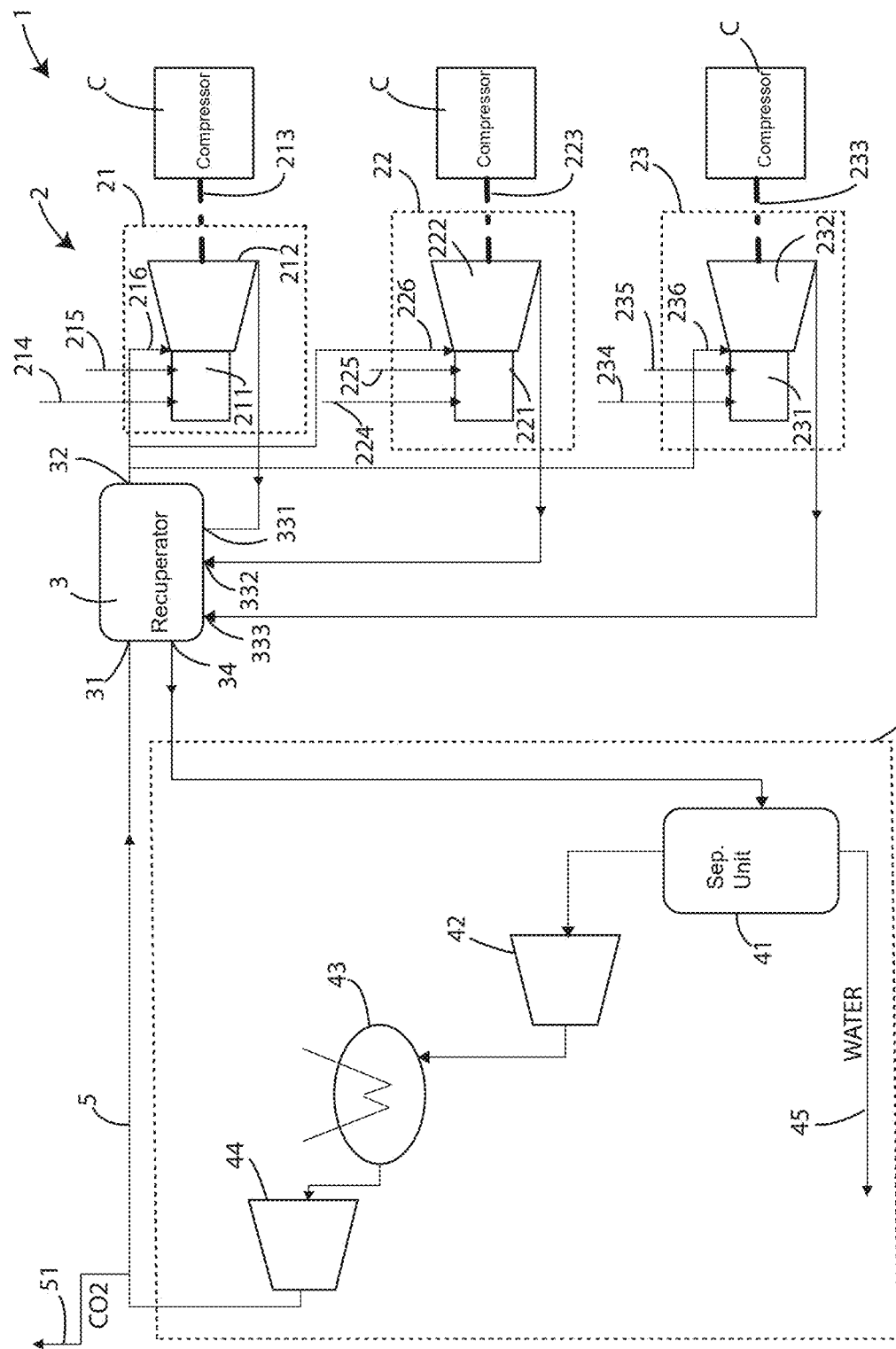
FIG. 7 illustrates a schematic of an energy conversion plant according to a seventh embodiment.

Referring to FIG. 7, a seventh embodiment of power generation plant 1 is illustrated, which, also in this case, as a layout similar to that of the fifth embodiments, it comprises only a single heat exchanger recuperator 3, connected to all the driving units 2, which, also, in this case, are three and in particular the first driving unit 21, the second driving unit 22, and the third driving unit 23.

In addition, each driving unit 21, 22, and 23, is connected through the relevant load to a centrifugal compressor C. In this embodiment, likewise the embodiment shown in FIG. 3, all the loads are mechanical.

Figure 8:
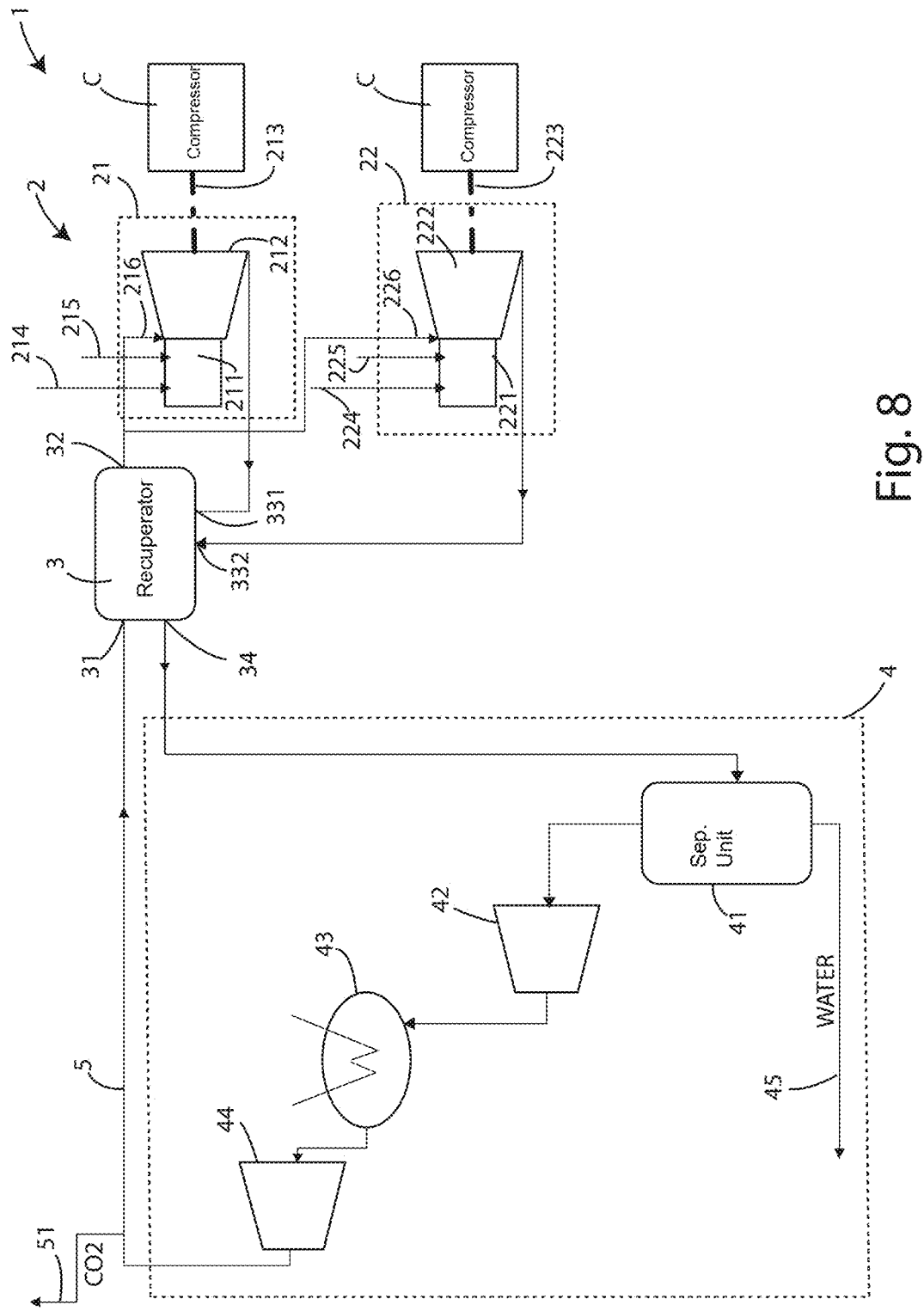
FIG. 8 illustrates a schematic of an energy conversion plant according to an eighth embodiment.

Referring to FIG. 8, an eighth embodiment of the energy conversion plant 1 is shown, comprising a single heat exchanger recuperator 3, connected to two driving units, indicated with the reference numbers 21 and 22, each one connected to centrifugal compressor C as the load.

In this case, it is realized the so-called energy generation island, since all the loads are centrifugal compressors C, intended to be connected to the mains or to supply electronic current.

Figure 9:
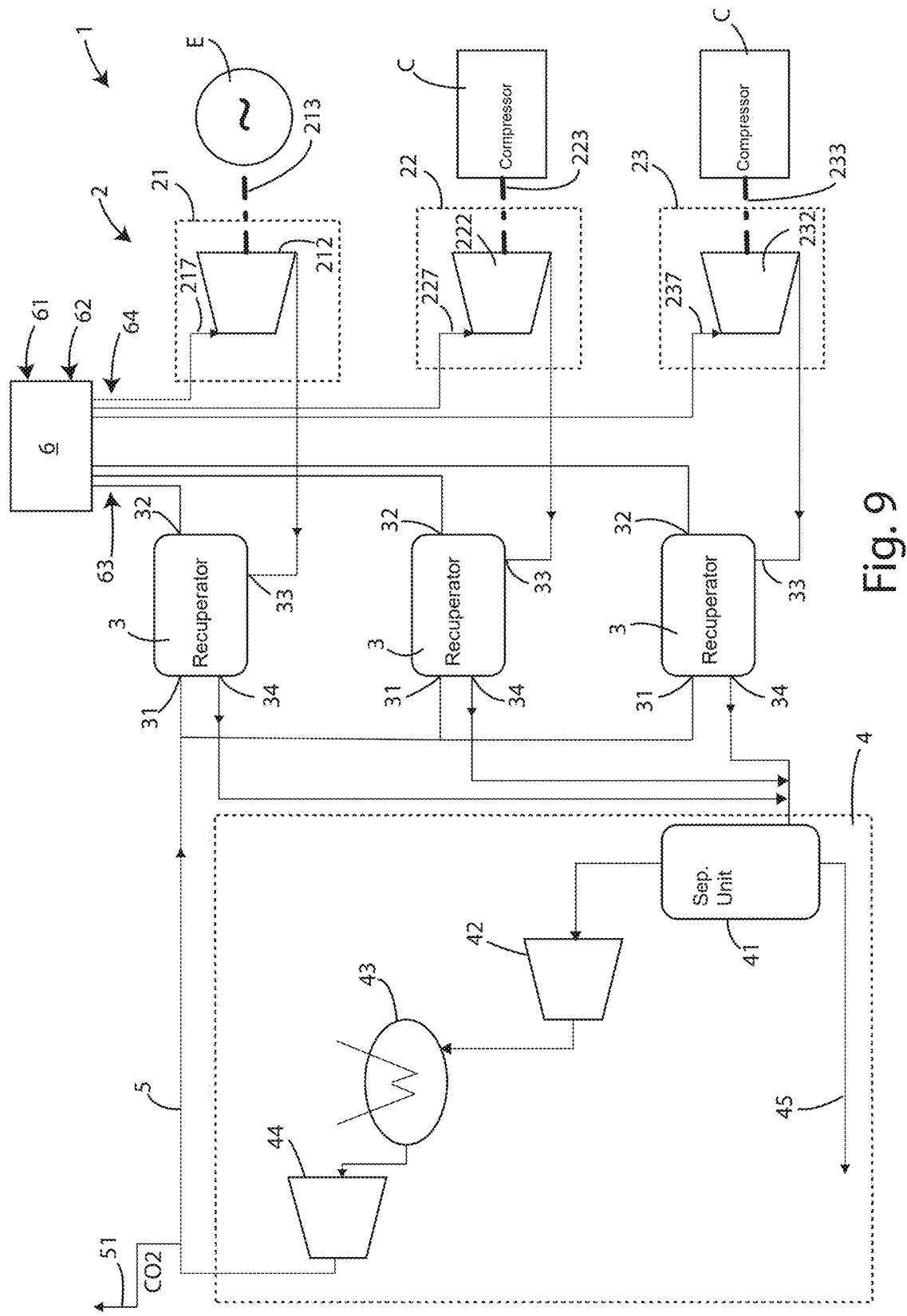
FIG. 9 illustrates a schematic of an energy conversion plant according to a ninth embodiment.

Referring to FIG. 9, a ninth embodiment of the energy conversion plant 1 is shown, similar, in term of structure, to the first embodiment, but for a centralized combustor 6, which is now common to all the driving units 21, 22, and 23.

The centralized combustor 6 has a fuel inlet 61, for the introduction of the fuel to be burned, an oxidant inlet 62, for the introduction of the additional fluid, namely carbon dioxide and pure oxygen. Also, the first outlet 32 of each of the exchanger recuperator 3 is connected to the centralized combustor 6, and specifically to the fluid inlets 63, to supply the fluid to be expanded, through which high pressure and high-temperature carbon dioxide are introduced into said centralized combustor 6. Finally, the combusted gas outlets 64 of the centralized combustor 6 is connected to the hot gas inlet 217, 227, and 237 of each driving unit 21, 22, and 23 respectively.

The operation of the energy conversion plant 1 of FIG. 9 is analogous to the first embodiment disclosed in FIG. 1. However, in the embodiment at issue, the fuel combustion supplied through the fuel inlet 61 is made by the centralized combustor 6, to the plurality of driving units 2 (which is this embodiment are not equipped with a relevant combustor. The combusted gas is then expanded into each driving unit 21, 22, and 23.

Figure 10:
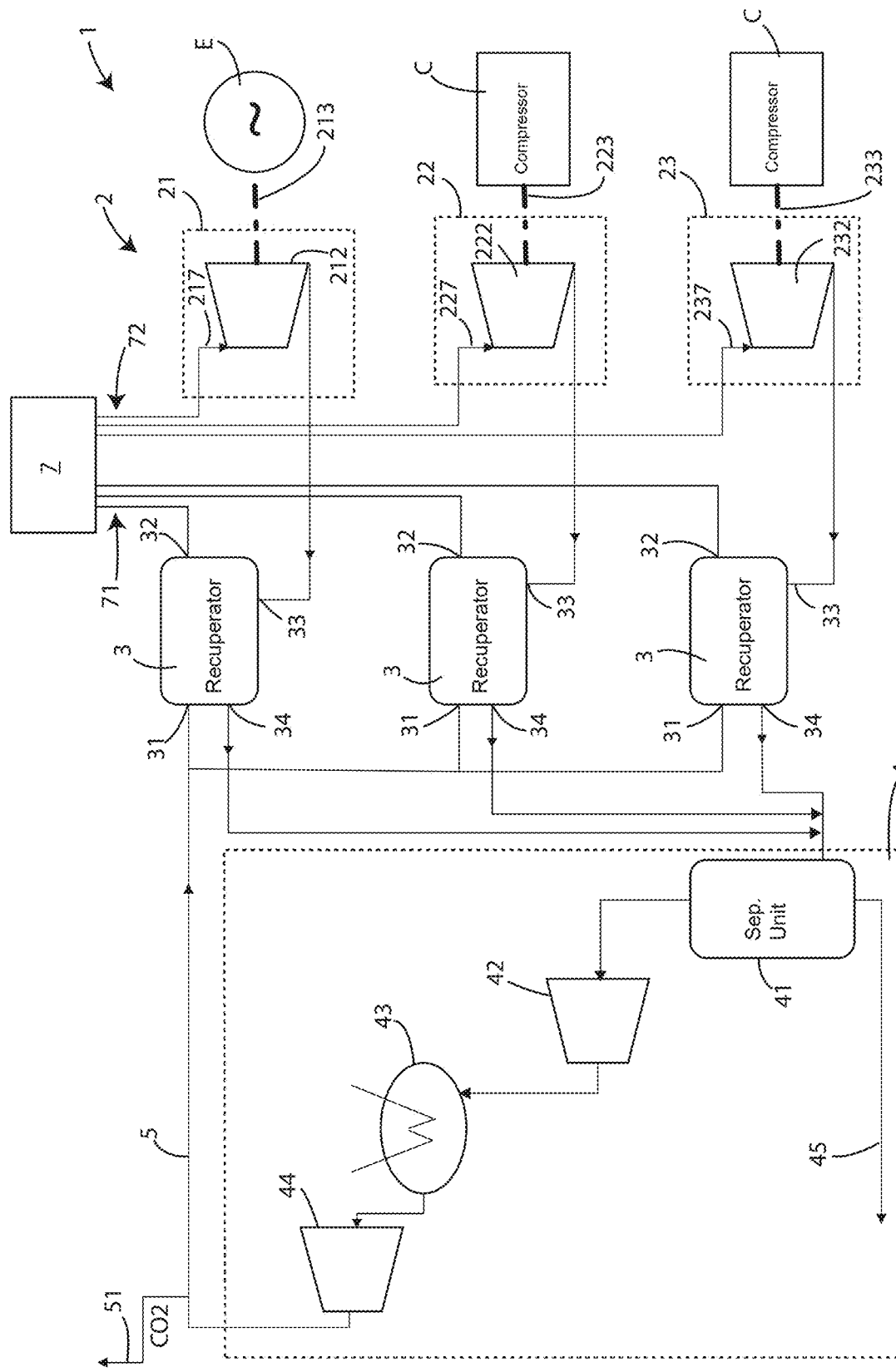
FIG. 10 illustrates a schematic of an energy conversion plant according to a tenth embodiment.

Referring to FIG. 10, a tenth embodiment of the energy conversion plant 1 is shown, similar, in term of structure, to the ninth embodiment, but instead of the centralized combustor 6, energy conversion plant 1 comprises a centralized heater 7.

The centralized heater 7 has fluid inlets 71 connected to the first outlet 32 of each of the exchanger recuperators 3, to supply the fluid to be expanded. The hot gas outlets 72 of the centralized heater 7 is connected to the hot gas inlet 217, 227, and 237 of each driving unit 21, 22, and 23 respectively.

The operation of the energy conversion plant 1 of FIG. 10 is analogous to that the ninth embodiment disclosed in FIG. 9. However, in the embodiment at issue, fluid coming from the heat exchangers 3 is heated by the centralized heater 7 and then distributed through the pipeline manifold departing from gas outlets 72 of the centralized heater 7, to the plurality of driving units 2. The combusted gas is then expanded into each driving unit 21, 22, and 23. The centralized heater 7 can be of several types and the heating energy can be obtained in any way, such as by combustion (carried out externally with respect to the centralized heater 7), irradiation, and the like.

An advantage of the present solution is that the plant efficiency is increased and it is possibly to allow a direct capture of carbon dioxide at high pressure.

It is also an advantage of the solution that no electric motors-driven compressor trains are required, thus reducing the overall capital expenditure of the plant. Also, a flat power output at ambient temperature is achieved, with an increased efficiency. Also, it is possible to apply the solution in brown field (retrofit) as well as green field.

While aspects of the invention have been described in terms of various specific embodiments, it will be apparent to those of ordinary skill in the art that many modifications, changes, and omissions are possible without departing from the spirit and scope of the claims. In addition, unless specified otherwise herein, the order or sequence of any process or method steps may be varied or re-sequenced according to alternative embodiments.

Reference has been made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures, or characteristics may be combined in any suitable manner in one or more embodiments.

When elements of various embodiments are introduced, the articles "a", "an", "the", and "said" are intended to mean that there are one or more of the elements. The terms "comprising", "including", and "having" are intended to be inclusive and mean that there may be additional elements other than the listed elements.

Barzanò & Zanardo Roma S.p.A.

The invention claimed is:

1. An energy conversion plant, comprising:
a fluid feedback line to supply a fluid;
a compression and pumping unit to compress and increase the pressure of the fluid feedback line to produce a compressed fluid in the fluid feedback line;
driving units, each driving unit connected to a respective load, each driving unit being capable of driving the respective load by expanding heated fluid;
heat exchange recuperators, each heat exchange recuperator associated with a respective driving unit of the driving units, each heat exchange recuperator connected between the fluid feedback line and the respective driving unit and connected between the respective driving unit and the compression and pumping unit,
wherein the heat exchange recuperators are arranged to receive and heat the compressed fluid supplied by the fluid feedback line and feed the heated fluid into the respective driving units, the heat exchange recuperators configured to heat the compressed fluid by exchanging the heat of the expanded fluid discharged from the respective driving units with the compressed fluid.

2. The energy conversion plant of claim 1, wherein the fluid comprises carbon dioxide.

3. The energy conversion plant of claim 1, wherein each heat exchange recuperator comprises a heat exchanger.

4. The energy conversion plant of claim 1, wherein each driving unit comprises:
a combustor having a fuel inlet configured to introduce fuel to be burned, an oxidant inlet to supply oxidant to the combustor, and a fluid inlet to supply the heated fluid to be expanded;
an expander operatively connected to the combustor;
a rotating shaft driven by the expander and connected to the load,
wherein each heat exchange recuperator comprises a first inlet connected to the fluid feedback line, a first outlet connected to the fluid inlet of the combustor of the respective driving unit, a second inlet connected to the expander of the respective driving unit, and a second outlet connected to the compression and pumping unit.

5. The energy conversion plant of claim 1, further comprising:
a centralized combustor having a fuel inlet configured to introduce fuel to be burned, an oxidant inlet to supply oxidant to the centralized combustor, fluid inlets to receive the heated fluid, and fluid outlets to deliver the heated fluid to be expanded;
wherein each driving unit comprises:
an expander;
a rotating shaft driven by the expander and connected to the load; and
a fluid inlet fluidly connected to a respective fluid outlet of the centralized combustor,
wherein each heat exchange recuperator has a first inlet connected to the fluid feedback line, a first outlet connected to a respective fluid inlet of the centralized combustor, at least one second inlet connected to the outlet of the expander of the respective driving unit, and a second outlet connected to the compression and pumping unit.

6. The energy conversion plant of claim 1, further comprising:
a centralized heater for further heating the heated fluid from the heat exchange recuperators, the centralized heater having fluid inlets to receive the heated fluid to be further heated, and fluid outlets to deliver the heated fluid to be expanded,
wherein each driving unit comprises:
an expander,
a rotating shaft driven by the expander and connected to the load, and
a fluid inlet fluidly connected to the fluid outlets of the centralized combustor,
wherein each heat exchange recuperator has a first inlet connected to the fluid feedback line, a first outlet connected to a respective fluid inlet of the fluid inlets of the centralized combustor, a second inlet connected to the respective expander of the driving unit, and a second outlet connected to the compression and pumping system.

7. The energy conversion plant of claim 1, wherein the compression and pumping unit comprises:
 a separation unit for separating water from the expanded fluid discharged from the driving units after the expanded fluid is cooled by the heat recuperator;
 a compressor for compressing the fluid and increasing the pressure of the fluid;
 a heat exchanger; and
 a pump operable to increase the pressure of the fluid, wherein the pump is connected between the heat exchanger and the fluid feedback line.

8. The energy conversion plant of claim 7, wherein the pump increases the pressure of the fluid up to 250-350 bar.

9. The energy conversion plant of claim 7, wherein the compressor increases the pressure of the fluid up to 60-100 bar.

10. The energy conversion plant of claim 1, further comprising an extraction line to extract the compressed fluid.

11. The energy conversion plant of claim 10, wherein the extraction line is connected to the fluid feedback line.

12. The energy conversion plant of claim 10, wherein the extraction line is connected upstream of the pump.

13. The energy conversion plant of claim 1, wherein the heated fluid fed into the driving units has a temperature between 500-700° C.

14. The energy conversion plant of claim 1, wherein a first respective load connected to a first driving unit of the driving units is an electric generator; and wherein a second respective load connected to a second driving unit of the driving units is an electric generator.

15. The energy conversion plant of claim 1, further comprising a third driving unit connected to a third load.

16. The energy conversion plant of claim 15, wherein a first respective load is an electric generator a second respective load is a centrifugal compressor, and the third load is a centrifugal compressor.

* * * * *